March 6, 1934.  J. J. DINEEN  1,950,048
NONSKID TIRE COVER
Filed Oct. 31, 1932

INVENTOR
John J. Dineen
BY Gardner W. Pearson
ATTORNEY

Patented Mar. 6, 1934

1,950,048

UNITED STATES PATENT OFFICE 1,950,048

NONSKID TIRE COVER

John J. Dineen, Lawrence, Mass.

Application October 31, 1932, Serial No. 640,459

2 Claims. (Cl. 152—14)

This invention relates to covers for the tires of automobiles. Its particular purpose is to provide a flexible non-skid tire cover which can be used in the place of the well known tire chains to prevent slipping and skidding on snow or ice and one which can also be used on smooth, worn tires not only for that purpose but to prolong their life.

This tire cover can also be used over rough roads where there are sharp stones or other cutting surfaces and, as the units are flexible and elastic, will fit with sufficient accuracy tires of different sizes and, as it is used with side chains of the usual construction, it can be made to fit tires of somewhat varying circumferences.

Another advantage of this cover is that if a unit wears out or if its connection with a side chain breaks, as there is no metal in the unit, it will not break nor bend the mudguards as often happens when one of the cross chains of the usual construction breaks, as it usually does, in the middle.

As the connections from the flexible and resilient principal units to the side chains are very short, even if chains are used for the connection, if anything breaks, no damage is done to the mudguards.

Each non-slip unit of my cover is so made that the surface which contacts with the roadway or with the ice or snow is flat and relatively large so that they have the effect of wide treads with deep depressions and the holding arms are so made that they will resist forward or backward slipping as well as side slipping and if there is any irregularity or projection in the roadway, these arms will engage it flexibly and stop or retard such movement.

My units being flexible and resilient and preferably made of rubber or similar material cannot crack as hard metal is likey to do under heavy loads, but will merely be compressed more or less.

In order to resist the tremendous force necessary to drive an automobile or truck forward or the side slipping when skidding and still retain the resiliency and elasticity, it is necessary or at least desirable for heavy work to reinforce the body of each unit preferably on its concave surface and also through its interior and also up into each holding arm.

This latter is accomplished by mouding into the structure, strong textile fabric in such a way as to permit bending and compressing but to prevent the arms ripping off or the body being torn.

This tire cover can also be used on hard, smooth roads without discomfort and without breaking or wearing unduly.

In the drawing, Fig. 1 is a plan view showing part of a tire with one section of my tire cover in place.

Figure 1:
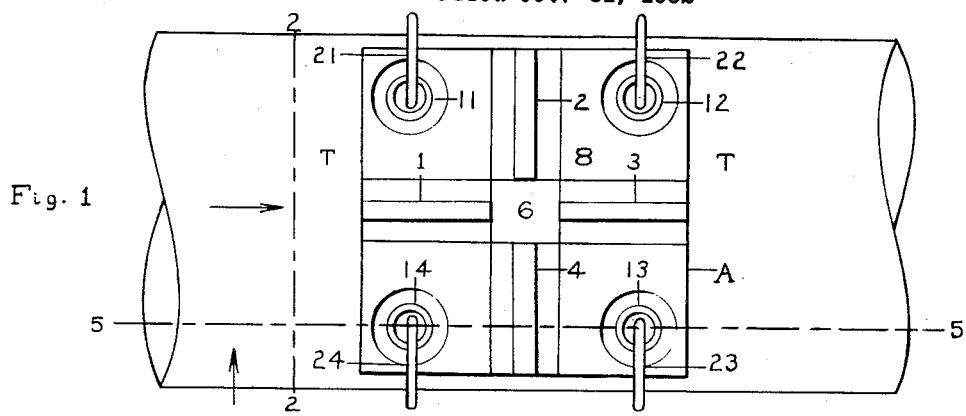
Figure 2:
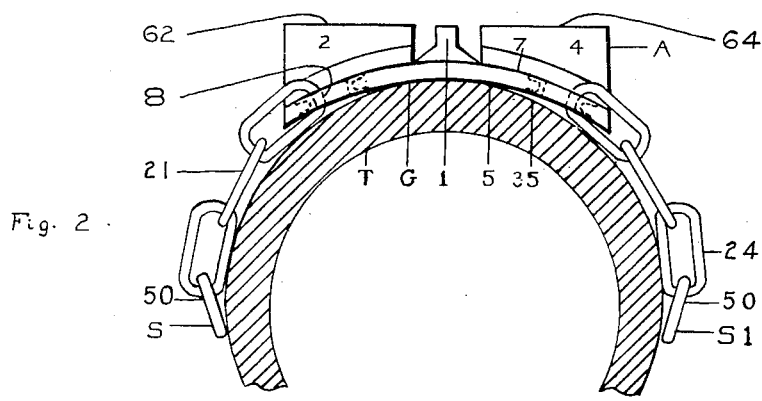
Fig. 2 is a vertical section on the line 2—2 of Fig. 1.
Figure 3:
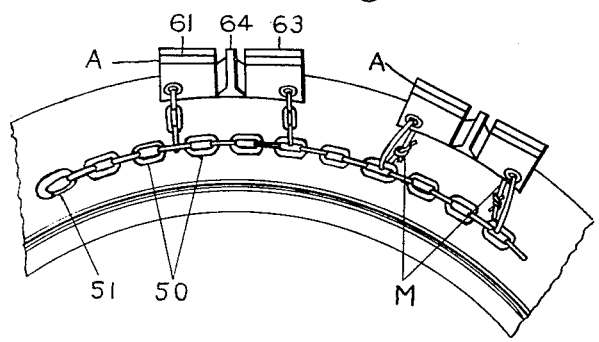
Fig. 3 is a side elevation showing on a reduced scale part of my tire cover in place on a tire.
Figure 4:
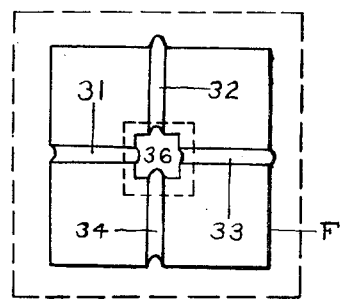
Fig. 4 is a diagram showing in dotted lines the shape of the reinforcing fabric for a unit of my tire cover and in full lines how this fabric is folded or bent so that it wil reinforce the arms as well as the body of the unit.
Figure 5:
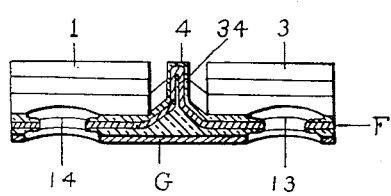
Fig. 5 is a vertical section on the line 5—5 of Fig. 1.
Figure 6:
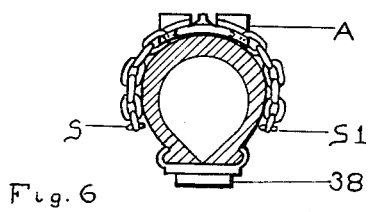
Fig. 6 is a vertical sectional view of a tire with my cover in place showing the preferred relation of the rim to the side chains and the tire cover.

In the drawing, T represents a tire of any usual form which extends inward to a rim 38 of any usual form and which has an outside face 35 which, as shown in the drawing, is substantially smooth. This convex face obviously, however, might be more or less roughened.

S and S¹ represent side chains which comprise links such as 50 and may have connecting hooks or clasps such as 51 by which the chains may be taken up or let out in the usual way.

The tire cover is made up of a plurality of rectangular units A, each having a body 8 curved so that its inner face 5 is concave to approximate the convex outer face 35 of a tire. At the concave inner side 5 is preferably a strip of reinforcing fabric G and through each corner is a hole preferably reinforced by a metal gromet indicated at 11, 12, 13 and 14.

In the preferred form, I use metal chains 21, 22, 23, 24 each of three or four links which connect unit A with the side chains. One of the links passes through a gromet hole and the other passes through one of the links such as 50 of a side chain.

Instead of metal chains, however, I can use thongs or cords such as M, each passed through a gromet hole and through a side link such as 50 and having its ends tied together.

1, 2, 3 and 4 indicate the four holding arms which are in the shape of a cross with an open center at 6 and which project from the outer face 7 of the unit, these arms preferably being so made that all of their outer surfaces 61, 62, 63 and 64 are flat and lie in the same plane so that all form a skeleton tread and when directly under the axle all are in contact with the ground at the same time.

In forming or moulding each unit A which is preferably made of rubber, a rectangular piece of fabric F is used with a square hole 36 in the center and this fabric is puckered up at 31, 32, 33, 34 so that part of the fabric will extend up respectively into each of the holding arms 1, 2, 3 and 4.

When the rubber or similar material has been vulcanized or otherwise hardened, this fabric reinforces not only the curved main body 8 but each of the holding arms.

I might use a resilient material such as rubber without reinforcement or it might be reinforced in some other way and I, therefore, claim a tire cover composed of resilient units of the form herein described whether reinforced or not.

I claim:

1. A non-skid tire cover which includes side chains and between them, a plurality of rectangular units each curved so that its inner face is concave to approximate the convex outer face of a tire and having four holding arms in the shape of a cross with an open centre projecting from its own outer face, the outer faces of all the arms lying in the same plane, each unit being made of rubber reinforced with a layer of fabric which extends up into the arms and another layer on its concave inner face and having near each corner a hole reinforced with a gromet from which a connecting chain extends to a side chain.

2. A non-skid tire cover which includes side chains and between them, a plurality of rectangular units each curved so that its inner face is concave to approximate the convex outer face of a tire and having four holding arms in the shape of a cross projecting from its own outer face, each unit being made of rubber reinforced with a layer of fabric which extends up into the arms, each corner of each unit being connected to a side chain.

JOHN J. DINEEN.